June 27, 1961     H. M. NYSTROM     2,990,089
BODY SUPPORT FOR BINOCULAR UNITS
Filed Sept. 30, 1957
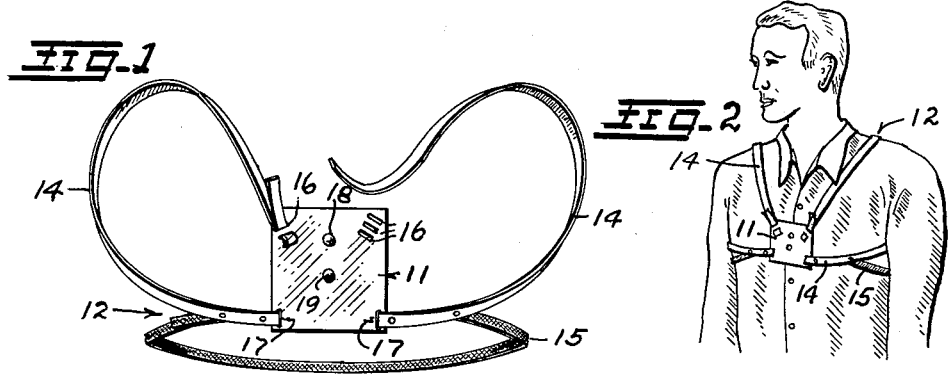
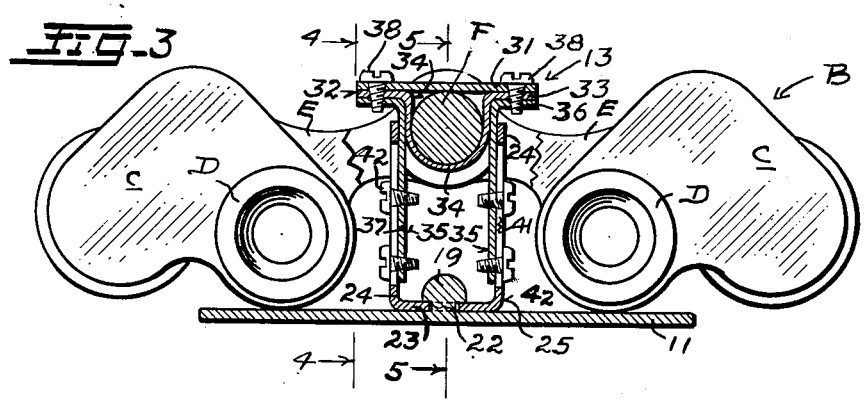
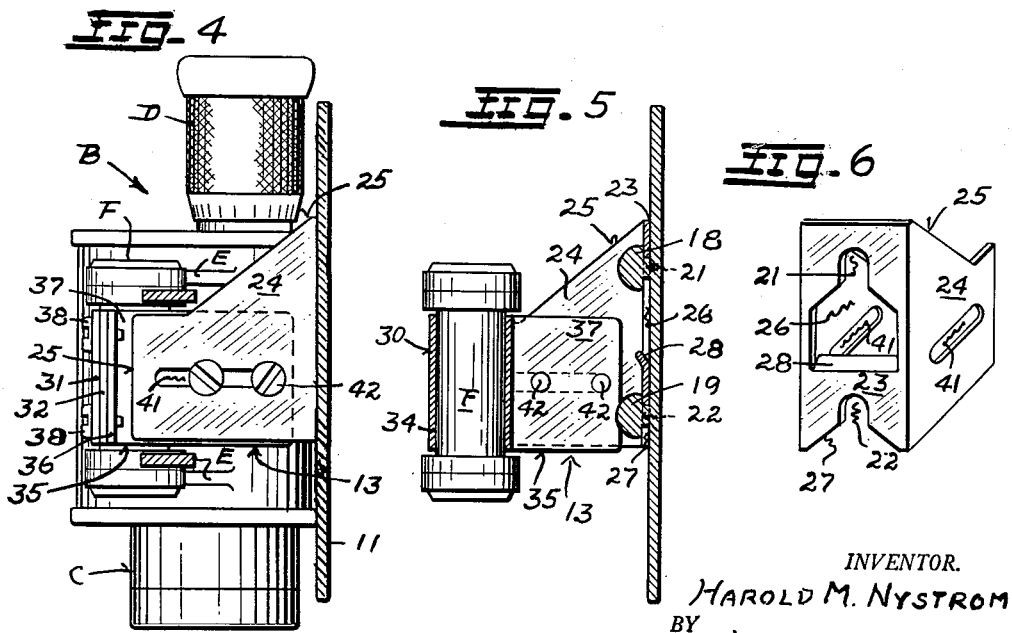
INVENTOR.
HAROLD M. NYSTROM
BY
Henry N. Young
ATTORNEY United States Patent Office 2,990,089
Patented June 27, 1961

2,990,089
BODY SUPPORT FOR BINOCULAR UNITS
Harold M. Nystrom, 1300 Monteith Drive,
Vallejo, Calif.
Filed Sept. 30, 1957, Ser. No. 687,098
5 Claims. (Cl. 224—5)

The invention relates to the mounting and dismounting of a binocular unit, or binoculars, at a readily accessible point on a user's body.

Hunters and surveyors and sports fans and others usually have occasion to intermittently use field glasses of the binocular type, and it is a general object of the present invention to so mount a binocular unit on a person's body as to provide for its removal for use and its return to its mounted position in a particularly ready manner.

A more specific object is to provide for firmly mounting a binocular unit on a support element comprising a plate member which is directly mounted in a most convenient position on a user's body by a relatively simple body-embracing harness.

Another object is to provide the means connecting a binocular unit to the support plate as an attaching bracket removably mounted on the binocular unit, in an arrangement such that no portion of the support plate per se protrudes unduly from the plate, which may then remain in mounted position on the person's body independently of the provision of binoculars to utilize it.

A further object is to provide an attaching bracket which is of adjustable length transversely of the harness-carried mounting plate whereby the relation of mounted binocular units of different structure and/or size to the mounting plate may be adjusted and maintained for effecting a firmed relation of the mounted unit to the support plate.

The invention possesses other objects and features of advantage, some of which, with the foregoing, will be set forth or be apparent in the following description of a typical embodiment thereof, and in the accompanying drawings, in which, FIGURE 1 is a view showing a mounting plate of the binocular support and of associated straps which are arranged to provide a body-engaging carrying harness for the plate.

FIGURE 2 shows the operative harness carrying the support plate on a person's body.

FIGURE 3 is a partly sectional view taken from the eyepiece end of a binocular unit mounted on the support plate of FIGURES 1 and 2, with the mounting means shown in intermediate section.

FIGURE 4 is a sectional elevation taken from the line 4—4 in FIGURE 3.

FIGURE 5 is a fragmentary view taken from the line 5—5 in FIGURE 3.

FIGURE 6 is a perspective rear view of a bracket base member of the support assembly.

For illustrating the features of the binocular support of my invention, the support is shown as applied for carrying a binocular unit B on a person's body generally opposite the breastbone, and said support generally comprises a support plate 11 carried by a body-embracing harness 12 and arranged to detachably support a bracket assembly 13 fixed to the binoculars to be supported. As particularly shown, the binoculars B comprise complementary mutually coplanar telescope sections C including eyepieces D therefor and having pairs of arms E extending laterally therefrom to a common hinged connection at a pintle member F which has its axis equally spaced from the lines of sight from the telescope sections C, it being understood that the hinged connection of the sections C provides for an adjusted spacing of the axes of the eyepieces D for fitting the binoculars to the eyes of different users, with independent focusing provided for said eyepieces which, in the illustrated binoculars, are laterally offset toward each other from said lines of sight from the telescope sections.

With particular reference to the harness 12, and in terms of the mounted position of the plate 11 on a user's body, flexible straps 14 extend from the bottom corners of the plate for their looping over the user's shoulders and a longitudinally adjusted attachment of their free ends with the corresponding upper corners of the plate, and a flexible strap 15 connects forward points of the straps 14 for looped engagement about the user's body beneath the armpits to generally hold the plate 11 against shifting upwardly from its set position. The harness straps 14 may be of webbing which is generally non-stretchable longitudinally thereof, while the strap 15 may be longitudinally elastic and adjustably secured at one end thereof to the engaged strap 14. The support harness 12 for the plate 11 thus provided by the straps 14 and 15 is essentially such that the plate may be firmly held at and against the body at a forward chest point thereof generally opposite the breastbone. As particularly illustrated, the support plate 11 directly provides a buckle means for adjustably engaging the detachable end of the straps 14, said means comprising three slots 16 at each of the upper plate corners for threadedly receiving the straps in a usual self-locking manner, while the other strap ends are re-retainedly looped through slots 17 at the corresponding lower plate corners.

It will now be noted that the plate 11 is provided with upper and lower headed pins or studs 18 and 19 extending fixedly outwardly therefrom in an upright intermediate line with respect to the mounted plate, and having extending shank portions between the heads thereof and the plate 11 simultaneously engageable in slots 21 and 22 provided in a flat base plate portion 23 connecting opposed parallel side portions 24 of a U-shaped bracket member 25. The slot 21 comprises an upper portion of a transverse opening 26 through the base plate 23, with the bottom portion of said opening somewhat wider than the head of the pin 18 for freely receiving the pin head therethrough and having upper guide edges thereof sloping to the bottom end of the slot, while an upwardly-directed V-notch 27 at the bottom of the base plate portion 23 of the member 25 has its side edges sloping as guides from the bottom of the said plate portion to the bottom of the slot 22. The spacing of the upper ends of the slots 21 and 22 is the same as that of the pins 18 and 19, whereby the shanks of the pins having their heads inserted through the opening 26 and the notch 27 may be simultaneously engaged in the slots while the pin heads engage the outer face of the plate 11 and the pins are thereby cooperative to mount and retain the member 25 on the pins and so on the plate 11. Preferably, and as shown, the bottom edge of the opening 26 is provided with an inturned lip 28 having utility in the manner hereinafter brought out.

The means for fixing the base member 25 of the bracket assembly 13 to the pintle member F of the binoculars B comprises a clamp structure 30 which includes a rectangular plate 31 and a plate 32 having the outline of the plate 31 and provided with coplanar flange portions 33 extending oppositely from an offset channel 34 which is arranged to fittedly and clampedly receive the pintle F between its bight and the plate 31. L-shaped members 35 of sheet material have mutually out-turned flange portions 36 fittedly engaging against the flanges 33 of the plate 32, while the other portions 37 of the members 35 are arranged to extend along the opposed faces of the sides 24 of the bracket base member 25 in opposed lapped relation thereto. As particularly shown, the flange portions 36 of the members 35 are fixed to the flanges 33 of the plate 32 and the pintle F is clamped in place between the plates 31 and 32 by clamp screws 38 which extend freely through the plate 31 and the flanges 33 of the plate 32 and threadedly engage the flanges 36 of the members 35.

Means are provided for releasably fixing the portions 37 of the plate members 35 to the sides 24 of the member 25 in adjustably lapped relation thereto, whereby the spacing of an engaged pintle member of a binoculars B from the support plate 11 may be adjusted for adapting the present support for the carrying of binoculars having different sizes and/or structural arrangements. Accordingly, and as illustrated, the sides 24 of the U-shaped base member 25 are provided with slots 41 for receiving therethrough the shanks of screws 42 which are threadedly engaged in the opposed portions 37 of the members 35, whereby a tightening of the screws may clampedly secure the portions 24 and 37 together for fitting various binoculars to the support plate 11. Alternatively, and particularly if the present support is to be used with a particular binocular unit of the type in which the telescope sections are connected at a common cylindrical connection but are not hingedly related, flanges 36 might be provided at the outer ends of the side portions 24 of the bracket base member 25 whereby to eliminate the members 35 per se and the provision for an in-and-out adjustment of a mounted spindle with reference to the support plate 11.

When the present support is to be used with binoculars of the particularly illustrated type having the telescope sections C hingedly related, the clamp assembly 30 is attached to the pintle member F and has the base member 25 mounted on the member for its spaced adjustment with respect to the base portion 23 of the base member 25. Having the eyepieces D of the binoculars appropriately and frictionally held set for the use of an individual, the mounting of the binoculars on a support plate 11 supported on the individual's body is effected by engaging the pins or studs 18 and 19 in the respective slots 21 and 22, while corresponding points of the telescope portions of the binoculars engage the front face of the plate 11, any required bracket adjustments being permitted while the clamp screws 42 are loosened.

Since the mounted binoculars are only frictionally retained in place on the support plate 11, an accidental loss of the mounted binocular unit may be readily prevented by providing it with a flexible tie strap or chain (not shown) for attaching the unit to the user's body around the neck or to the user's clothing or to the plate 11 or to the harness 12. It will also be noted that the inturned lip 28 at the bottom of the plate opening 26 in the bracket base plate 23 is operative to prevent the engagement of the opening edge thereat behind the head of the upper support stud 18, and thus prevent an unwanted catching of the bracket base plate 23, as the bracket is removably lifted from its mounted position on the studs 18 and 19. It will also be understood that if the shank of the upper stud 18 and the corresponding slot 21 are larger than those of the lower stud 19 and the receiving lower slot 22, the mounting bracket may not be readily erroneously engaged with the support plate 11.

While the bracket portion of the present body-carried support for binoculars is particularly shown as utilized with a binocular unit having its telescope sections hingedly related, it will be understood that the present device is readily adaptable for mounting binoculars having relatively fixed telescope portions, and that the in-and-out adjustability of the bracket with respect to the support plate, as before, facilitates the provision for a rigid mounting of this type of binoculars on the plate. After the support plate 11 has been fitted to a binocular unit and the bracket clamp screws are tightened, the unitary assembly thus provided may be removed and replaced with respect to its mounted support on the plate 11 without changing the mutual setting of the eyepieces, and the binoculars may thus be used repeatedly by the same person without subsequently requiring adjustments of the eyepiece relation, it being understood that the removable engagement of the mounted binocular unit with the plate 11 fixedly mounts the same with respect to the plate.

From the foregoing description taken in connection with the accompanying drawings, the advantages of the present Body-Carried Support For Binocular Units will be readily understood by those skilled in the art to which the invention appertains. While I have shown and described a structure and operative arrangement which I now consider to be a preferred embodiment of my invention, I desire to have it understood that the showings are primarily illustrative, and that such changes and developments may be made, when desired, as fall within the scope of the following claims.

I claim:

1. In combination with a binocular unit arranged to be supportedly held in a person's hand while in use and having mutually coplanar telescope portions disposed at opposite sides of a common connection in symmetrical relation to an axis of symmetry for the portions, a rigid support plate, a means mounting the plate in relatively fixed upright position on the front of a person's body with a front face of the plate directed outwardly of the body, a bracket extending from the binocular unit at said connection and between the telescope portions in radial relation to said axis of symmetry for the portions and having an outer end face which is parallel to said axis, and means directly cooperative between the bracket and plate at the respective said outer end and forward faces thereof for dismountably mounting the bracket on the plate for a simultaneous disposal of both telescope portions of the unit similarly along and oposite the front plate face in direct lateral positioning contact therewith while the unit is not in use.

2. In combination with a binocular unit having mutually coplanar telescope portions disposed at opposite sides of a hinged connection for the portions and providing a common axis of symmetry and of relative spacing adjustment for the eye-pieces of the portions, a rigid support plate providing a flat face, a means for mounting the plate in upright fixed position on the front of a person's body with said flat face disposed outwardly of the body, a bracket fixed to and extending from the binocular unit at said connection in radial relation to said axis and between the telescope portions longitudinally thereof, and means directly cooperative between the bracket and plate dismountably mounting the unit-mounted bracket directly on the plate to dispose said axis in upright position while the telescope portions of the unit extend similarly along and opposite the front plate face in a direct lateral unit-positioning contact of both said portions therewith.

3. The structure of claim 2 having the bracket of adjustable length whereby a set spaced adjustment of the telescope eye-pieces of the unit for the use of the unit by a particular person may be maintained while the unit is mounted on the plate by having both telescope portions laterally and directly contacting the plate when the length of the bracket has been appropriately adjusted.

4. In combination with a binocular unit arranged to be supportedly held in a person's hand while in use and comprising laterally spaced and mutually coplanar telescope portions having a connection providing a common axis of symmetry for the portions, a rigid support plate providing a flat face, a harness means mounting the plate in upright position on and at the front of the person's body in relatively fixed relation thereto with said flat face of the plate directed outwardly of the body, a sectional bracket of adjustable length extending from the binocular unit at said connection in fixed radial relation to said axis and disposed between the telescope portions longitudinally thereof, and a means directly cooperative between the bracket and plate for dismountably and remountably mounting the bracket directly on the plate to dispose said unit axis in upright position while the telescope portions of the unit extend opposite the front plate face in a direct simultaneous and lateral contact of both said portions therewith.

5. The structure of claim 4 whereof the last means comprises a stud-and-slot connection between the bracket and plate.

References Cited in the file of this patent

UNITED STATES PATENTS

| | | | |
|---|---|---|---|
| 702,292 | Edmonds | June 10, | 1902 |
| 1,018,771 | Neuburger | Feb. 27, | 1912 |
| 1,198,423 | Lude et al. | Sept. 19, | 1916 |
| 1,347,540 | Godard | July 27, | 1920 |
| 2,334,036 | Roller | Nov. 9, | 1943 |
| 2,636,822 | Anderson | Apr. 28, | 1953 |

FOREIGN PATENTS

| | | | |
|---|---|---|---|
| 294,854 | Great Britain | Aug. 2, | 1928 |
| 901,941 | Germany | Jan. 18, | 1954 |